United States Patent

Carman et al.

[11] Patent Number: 5,360,237
[45] Date of Patent: * Nov. 1, 1994

[54] QUICK CONNECTOR

[75] Inventors: Anthony K. Carman, Waterford; Duane J. Pontbriand, Metamora, both of Mich.

[73] Assignee: ITT Corporation, New York, N.Y.

[ * ] Notice: The portion of the term of this patent subsequent to Oct. 11, 2011 has been disclaimed.

[21] Appl. No.: 35,823

[22] Filed: Mar. 23, 1993

[51] Int. Cl.$^5$ ............................................. F16L 35/00
[52] U.S. Cl. ..................... 285/81; 285/319; 285/921; 24/545; 24/555; 24/16 R
[58] Field of Search ............... 285/319, 921, 924, 82, 285/114, 81; 24/16 R, 545, 547, 555, 563, 543, 573.1

[56] References Cited

U.S. PATENT DOCUMENTS

| | | | |
|---|---|---|---|
| 1,436,882 | 11/1922 | Knepper | 285/319 |
| 2,413,730 | 1/1947 | Samiran | 285/82 X |
| 3,469,864 | 9/1969 | Guerrero | |
| 3,801,954 | 4/1974 | Dorrell | 285/82 X |
| 3,858,915 | 1/1975 | DeVincent | 285/924 X |
| 3,945,669 | 3/1976 | Bochory | 285/82 |
| 4,244,608 | 1/1981 | Stuemky | 24/573.1 |
| 4,874,174 | 10/1989 | Kojima et al. | 285/82 |
| 5,112,085 | 5/1992 | Busch et al. | 285/319 X |
| 5,152,555 | 10/1992 | Szabo | 285/319 X |
| 5,195,787 | 3/1993 | Bartholomew | 285/921 X |

FOREIGN PATENT DOCUMENTS

| | | | |
|---|---|---|---|
| 2291438 | 6/1976 | France | 285/924 |
| 9015281 | 12/1990 | WIPO | 285/319 |

*Primary Examiner*—Randolph A. Reese
*Assistant Examiner*—Heather Chun Shackelford
*Attorney, Agent, or Firm*—Robert P. Seitter; J. Gordon Lewis

[57] ABSTRACT

A quick connector for fast connection of fluid carrying assemblies such as a mating tube and a fluid unit. The connector includes a connector body which houses the connector components and accepts a redundant clip which is adapted to engage an upset bead of the male tube. The redundant clip is generally L-shaped and includes a retaining head which is inserted into the connector body and is adapted to engage the upset bead, a body portion which extends along the side of the connector body and in the preferred embodiment is contoured to mate with the connector body and a base member which includes a camming edge for facilitating the insertion of the retainer head into the connector body.

16 Claims, 1 Drawing Sheet

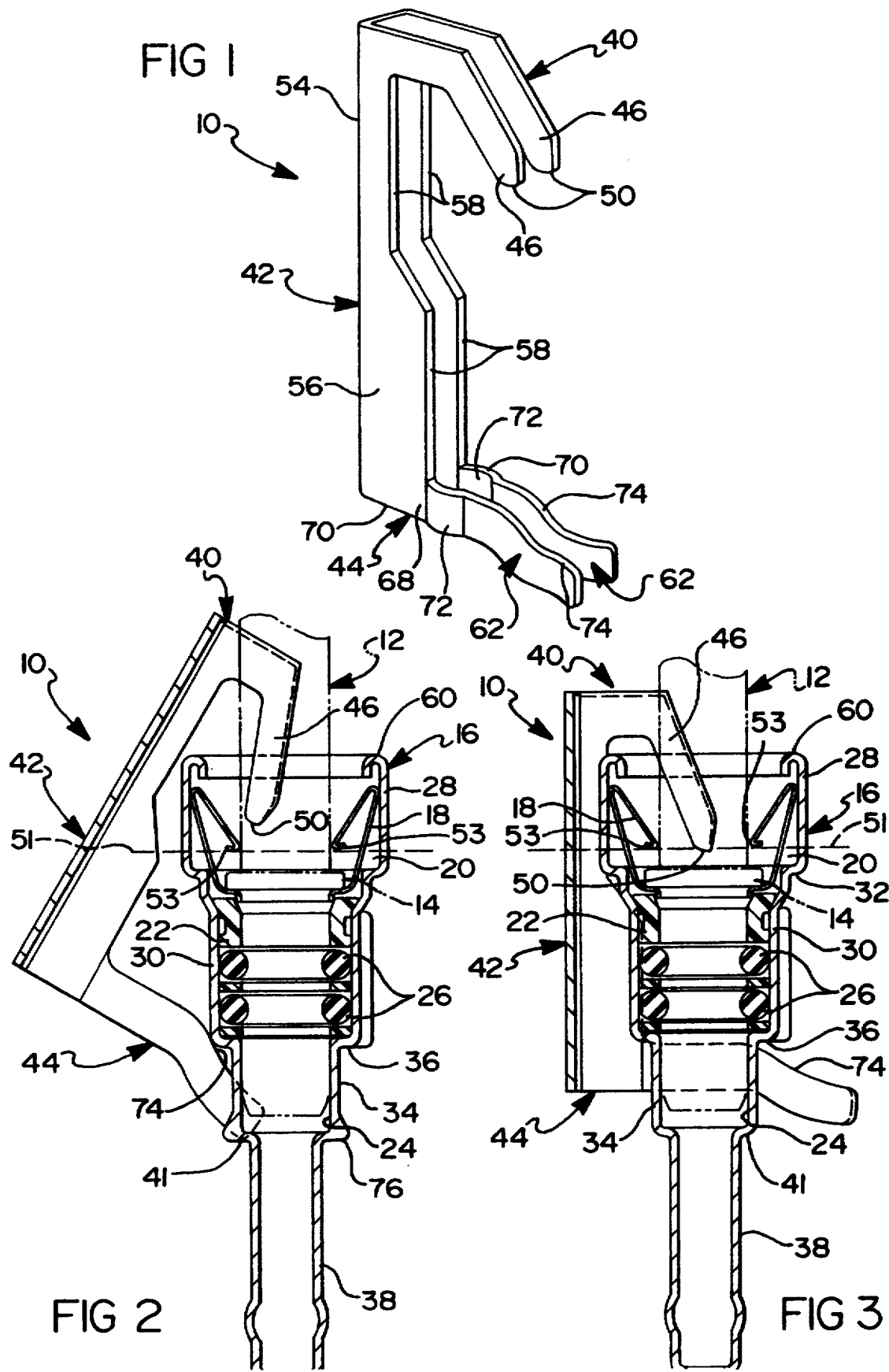

QUICK CONNECTOR

BACKGROUND OF THE INVENTION

This invention generally relates to quick connectors and more particularly to a redundant clip for quick connectors. More particularly, the present invention is an improvement over the Quick Connector disclosed in U.S. Pat. Application No. 08/012,715 filed Feb. 3, 1993, and assigned to the assignee of the present application.

Quick connectors are known and have been widely used in the art and are used in fluid carrying assemblies such as automobile assembly plants and service centers. More recently, these connectors have been provided in the form of a unitary connector body which is joined with the male end of a mating tube. The recent connectors use an internal connector component which receives an upset bead on the male tube member to retain the male tube member within the unitary connector. These recent connectors utilize either a pair of O-rings or a one-piece seal with multiple ribs to seal the male member with respect to the unitary connector. The O-rings or ribs surround the center male end of the mating tube. These connectors have the disadvantage that if an accidental disconnection occurs, fluid can flow out of the connector body. These connectors have the further disadvantage that an indication as to whether a proper lock connection has been provided is not readily apparent.

U.S. Pat. No. 5,069,424 issued to Robert Dennany and Ken Randall and assigned to the assignee of the present invention, ITT Corporation, addresses the above problems that occur with single clips. The '424 patent discloses a secondary retaining clip which had means for engaging a portion of the housing to releasably lock the secondary retaining clip to the housing. This retaining clip has resilient finger portions which are received within annular grooves in the unitary connector housing. The retaining clip has an inwardly directed portion which will engage the bead of the male tube if it is attempted to be removed. The secondary clip can only be connected if the male tube is properly received within the unitary connector.

One disadvantage of the U.S. Pat. No. '424 connector is that it requires an annular groove to be formed in the housing. Further, the secondary clip would likely require one or more tools in order to remove the resilient fingers from the annular groove formed in the housing.

The quick connect disclosed in U.S. Pat. Application No. 08/012,715 is generally L-shaped and includes a retaining head, a body portion and a base portion. The retaining head is adapted to engage the upset of the male tube when the male tube is positioned within the recess of the connector housing. The retaining head is defined by a pair of spaced fingers ending in engaging ears. The engaging ears extend inwardly with respect to each other to form a reduced space between the fingers. The reduced space has a width which is less that the diameter of the male tube so that the ears have to be biased outwardly to receive the male tube.

The base portion is defined by spaced leg members which extend outwardly from the body portion and are preferably joined at their ends. The leg members are spaced apart a distance which is slightly less than the outer diameter of the reduced section of the connector housing so that they bias against the reduced section. In the preferred embodiment, the leg members have first and second spaced detents to receive the reduced section. These detents correspond to the latched and unlatched positions of the clip. Each of the leg members includes a top edge that defines a cam surface for engaging the bottom of the reduced surface to facilitate the insertion of the retaining head into the recess of the connector housing and for locking the clip in place. The cam and leg members act as a lever giving substantial mechanical advantage to insertion of the head portion. The cam surface ends in a locking surface which is adjacent the body portion and is adapted to engage the bottom of the reduced surface when the clip is in the latched position. This engagement provides the needed retention force to retain the tube in the connector.

In use, the clip is mounted to tile connector housing by the base member. It is intended that the clip always remain attached to the connector housing and in particular to the reduced section. In the disclosed embodiment, the clip is mounted onto the reduced section by separating the legs and placing the reduced section between them and then snapping the free ends of the legs together. The legs are biased against the reduced section of the connector housing and can slide with respect to the housing.

The above-described redundant clip provides numerous advantages as more fully described in U.S. Pat. Application No. 08/012,715; however, there are disadvantages that the clip of the present invention overcomes. The U.S. Pat. No. '715 clip is intended to be tethered to the female connector which requires that the base be fairly long to accommodate closing means. This requires more material and increases costs. Additionally, when connected, the U.S. Pat. No. '715 clip extends beyond tile female clip a considerable distance making the clip difficult to use in tight locations. Further, due to the clip being tethered, tile head is shorter to facilitate assembly. This shorter head is not long enough to form a double lock on the upset of the male member at the line of engagement which is defined by the locking fingers of the primary retainer. For the redundant clip to act against the upset, the upset must be outside the locking fingers of the primary retainer. Such a condition only exists when the male member has not been properly inserted or the primary retainer has failed. Still further, the clip requires several steps for assembly.

SUMMARY OF THE INVENTION

The present invention overcomes the above problems with known quick connects and redundant quick connects and provides other advantages as well.

The present invention discloses a locking clip for use in redundantly retaining a male member within a female connector. The male member has an upset portion and the female connector has a recess for receiving the male member, the upset, and a primary retaining clip. The primary retaining clip is principally responsible for retaining the male member within the female member. The primary clip has locking tabs positioned adjacent the upset when the male member is fully inserted into the female member. The locking tabs define a line of engagement beyond which the upset cannot pass after having been fully inserted.

The locking clip includes a body portion and a retaining head having spaced fingers adapted to be received within the female member. The fingers are generally flat members which extend from the body portion and are generally parallel to one another. The spaced fingers have free ends that when fully inserted into the female member are at least at the line of engagement, and preferably extend beyond the line of engagement.

A base portion extends from the end of the body portion. The base portion is defined by spaced leg members which are spaced apart a distance which is slightly less than the outer diameter of the female connector so that the legs bias against the female connector when the redundant clip is locked in place. The female member includes a portion with a reduced diameter which defines an engaging ledge. The base portion of the clip is adapted to engage the engaging ledge when the clip is installed onto the female member.

In the preferred embodiment, the leg members have a top edge that defines a cam surface for engaging the female connector at the engaging ledge to facilitate movement of the clip to the clipped position. Further, the leg members have opposed detents to receive the reduced section when the clip is in the clipped position.

As is typical, the female member has an exterior surface that is contoured to define at least a first section, a reduced diameter second section and a third section that has an outer diameter greater than the second section. The first and second sections have the engaging surface therebetween.

Although the preferred embodiment relies upon the cam surface to facilitate clipping the clip on the female member, in another embodiment, the legs are sufficiently flexible to flex about the second or third sections and ultimately snap about the second section when the clip is clipped in place. This simplifies installation and removal of the clip.

As should be appreciated, the clip can be locked and unlocked without the need for tools. The clip is an exterior clip which is highly reliable and gives a clear indication when the clip is properly fastened. The clip is only properly fastened when the body member of tile clip is adjacent and parallel to the body housing. In tile preferred embodiment, the mating contour of the inside edge of the body member of the clip with the exterior surface of the housing make a sure indication of proper alignment. It also provides the advantage of a redundant or a secondary clip to ensure against improper installation of the primary clip. A still further advantage is that the clip does not require modification of a standard connector housing, the clip is merely snapped over a reduced portion of the standard housing. The clip is also less expensive to manufacture, easier to clip onto a housing and able to be used in tight spaces. A still further advantage is that the legs of the base are more resilient and can be used on various sizes of connectors. Overall, it is a much more versatile clip than previously available.

BRIEF DESCRIPTION OF THE DRAWINGS

FIG. 1 is a perspective view of the clip of the present invention.

FIG. 2 is a side view of the present invention in the unlocked position.

FIG. 3 is a side view of the present invention in the locked position.

DETAILED DESCRIPTION OF THE INVENTION

With reference to FIG. 1, the redundant clip of the present invention is shown generally at 10. In the preferred embodiment, the clip is made from 301 stainless steel, ¾ hard with a thickness of 0.032 to 0.036 inches.

The clip is used to retain a tube 12 within a connector housing 16. As should be appreciated, the tube 12 and the connector housing 16 are standard quick connects. With reference to FIGS. 2 and 3, the tube 12 includes an upset 14 and in the disclosed embodiment the connector housing 16 includes locking fingers 18 mounted in the interior 20 of the housing. The fingers 18 are adapted to retain the tube 12 within the female housing 16. The connector housing includes a top hat 22 and a bearing surface 24 for maintaining the alignment of the tube 12 within connector housing 16. O-rings 26 are provided to seal the male tube 12 with respect to the connector housing 16.

The exterior of connector housing 16 is contoured and has an exterior surface defined by a first section 28, a reduced diameter second section 30 which is separated from section 28 by a base 32. A further reduced diameter third section 34 which is separated from section 30 by a base 36. A still further reduced section 38 which is separated by a base 41. Section 38 is adapted to be inserted into a hose member.

Broadly, the redundant quick connector 10 of the present invention is generally L-shaped and has a retaining head 40, a body member 42 and a base member 44. The retaining head 40 is adapted to be inserted into the connector housing 16 and locked against the upset 14 of the tube 12 if the tube is attempted to be pulled out of housing 16. The body member 42 joins the retaining head 40 and the base member 44 and is adapted to adjoin the connector housing 16 and to provide retention support to the clip 10. The base member 44 clips to the connector housing 16 and in the preferred embodiment provides a camming surface for facilitating the locking of the clip 10.

The retaining head 40 is adapted to engage the upset 14 of tube 12. The retaining head 40 is generally hook shaped and is defined by a pair of spaced fingers 46. As disclosed, the spaced fingers have a generally flat end portion 50 for engaging the upset 14.

The fingers 46 are generally flat and parallel to one another. The length of fingers 46 is sufficiently long to insure that the flat end portion 50 is at least at the line of engagement 51. Line of engagement 51 is the imaginary line defined by the ends 53 of locking fingers 18.

The body portion 42 is defined by a channel having a base 54 and sidewalls 56. The sidewalls 56 extend generally perpendicular to base 54 and end in an edge 58. In the disclosed embodiment, the edge 58 is contoured to have the same general shape as and to generally mate with the exterior contour of connector housing 16. The channel shape of body portion 42 adds strength to the clip and provides tube pull-off retention in excess of 100 LBS force.

As can be seen, the retaining head 40 extends outwardly from the body portion 42 at an angle with respect to the body portion 42. The retaining head 40 is spaced from the body portion 42 by a distance which is slightly greater than the width of the overturned edge 60 of tile connector housing 16. This space allows the retaining head 40 to be inserted into the connector housing 16.

The base portion 44 includes spaced leg members 62 which extend outwardly from body portion 42. Leg members 62 are preferably elongated relatively thin members having sides 68 and top and bottom edges 70. The sides 68 are spaced apart a distance which is slightly less than the outer diameter of the third section 34 of connector housing 16. Because the distance is less, legs 64 are biased against third section 34, but are free to slide with respect to section 34. Each of the sides 66 have outwardly bowed sections or detents 72 for receipt of the third section 34 as leg members 64 are slid along the third section 34. Detent 72 corresponds to the locked position, see FIG. 3, of clip 10.

The top edge 70 of each leg member 62 defines a cam surface shown generally at 74. The cam surface 74 functions to pull the retaining head 40 into the connector housing 16 and facilitates movement of the connector 10 to its clipped position. Cam surface 74 engages the base 36 of the second section 30. In the embodiment illustrated in FIG. 1, the third section 34 has a guide or retaining surface 76 to keep the leg members 62 adjacent to the base 36. It should be understood that some connectors do not have feature 76. It is not necessary to tile proper functioning of tile clip 10.

Referring now to FIGS. 2 and 3, the camming action of edge 74 is illustrated. With pressure applied to base 54 of body member 42 just behind the base member 44, the legs are caused to slide along the third section 34 and the cam surface 74 is caused to cam against the base 36. It should be appreciated that the ears 48 are biased against the tube 12.

To attach tile clip 10 to the connector 16, the spaced fingers 46 are inserted into the female connector 16. See FIG. 2. Pressure is then applied to the body member 42 forcing the leg members 62 apart and sliding them over the third section 34. The clip 10 is fully clipped onto the connector 16 when the section 34 is received within detents 72. To facilitate the snapping of clip 10 onto connector 16, the free ends 64 of legs 62 are turned outwardly so that it is easy to begin the spreading of legs 62.

The legs 62 are preferably sufficiently resilient so that the clip 10 is easily snapped in place. In the preferred embodiment, the legs 62 are sufficiently resilient so that if the cam surface 74 does not engage against base 36, the legs can still be spread and snapped in place.

With reference to FIG. 3, the clip 10 is in the locked position. In this position, the detent 72 is engaging the third section 34 and the retaining head 40 is inserted into the connector housing to retain the tube 12 therein. The top edge 70 of legs 62 is abutting the base 36. In this way, the retention force of the clip or the pull-out strength is determined by the shear strength of the body member 42 at the intersection of the head 40 and base member 44. As should be appreciated, the tip 50 of ears 48 is generally aligned with the line of contact of the detent 72 and the base member 36 to reduce the bending moment in the body member 42. Additionally, the edge 58 is illustrated as closely conforming to the outer contour of the connector housing 16.

To disconnect the tube 12 from the connector housing 16, the base member is slid away from the connector housing 16 to the position illustrated in FIG. 2. The edge 70 cams against base 36 until legs 62 are free of the connector 16 and the retaining head 40 can then be slid out of the connector housing 16.

As should be appreciated, the clip 10 can be locked and unlocked without the need for tools. What has been disclosed, is a quick connector which provides a redundant clip having superior pull-off strength which is easy to manufacture and easy to use and that does not require the use of tools. Additionally, the clip provides visual indication of a properly locked assembly and precludes outflow of fluid if there is improper connection of the primary connector, and which overcomes the disadvantages of the prior art. The form of the invention illustrated and described herein is a preferred embodiment of these teachings. It is shown as an illustration of the inventive concepts, however, rather than by way of limitation, and it is pointed out that various modifications and alterations may be made within the scope of the appended claims.

What is claimed is:

1. A locking clip for use in redundantly retaining a male member within a female connector, said female connector having a primary retaining clip, said male member having an upset portion and said female connector having a recess for receiving said male member and said upset with said primary retaining clip retaining said male member within said female member, said primary clip having locking tabs positioned adjacent to said upset when said male member is inserted into said female member, said locking tabs defining a line of engagement beyond which said upset cannot freely pass after having been inserted beyond said line of engagement, said locking clip comprising:

a body portion;

a retaining head having spaced fingers adapted to be received within said female member, said fingers being generally flat members which extend from said body portion and are generally parallel to one another, said spaced fingers having free ends that when fully inserted into said female member are at least at said line of engagement; and a base portion extending from said body portion and spaced from said retaining head, said base portion being defined by spaced leg members which are spaced apart a distance which is slightly less than the outer diameter of said female connector such that said legs bias against said female connector when said redundant clip is locked onto said female member and having a cam surface at an end of each leg disposed toward a retaining head and with the cam surface ramming away from the head distal to the body, said female member including a portion with a reduced diameter defining an engaging ledge, said cam surface being adapted to engage said engaging ledge when said clip is installed onto said female member;

said clip being adapted to engage said engaging ledge and said upset to redundantly retain said male member in said female member.

2. The locking clip of claim 1, wherein said clip is generally L-shaped.

3. The locking clip of claim 1, wherein said leg members have opposed detents to receive said reduced section.

4. The locking clip of claim 1, wherein said female member has an exterior surface that is contoured to define at least a first section and a reduced diameter second section, said first and second sections having an engaging surface therebetween, said legs being received about said second section with said cam surface cammingly engaging against said engaging surface as said locking clip is clipped to said female member.

5. The locking clip of claim 4, wherein said cam surface ends in a locking surface adjacent said body member which is adapted to engage said engaging surface when said retaining head is received within said female connector recess.

6. The locking clip of claim 1, wherein said body portion includes a channel having a base and sidewalls, said sidewalls extending generally perpendicular to said base and ending in an edge that is contoured to generally mate with the exterior contour of said female member.

7. The locking clip of claim 6, wherein said retaining head extends outwardly from said body portion at an angle with respect to said body portion and spaced from said body portion by a distance slightly greater than the distance between said exterior surface of said female member and said recess.

8. The locking clip of claim 1, wherein said leg members are laterally flexible and adapted to be resiliently flexed to receive said female member.

9. The locking clip of claim 1, wherein said female member has an exterior surface that is contoured to define at least a first section, a reduced diameter second section and a third section that has an outer diameter less than said second section, said first and second sections having an engaging surface therebetween, said legs being laterally flexible and adapted to be resiliently flexible to flex about said second or third sections and snap about said second section when said clip is properly in place.

10. The locking clip of claim 1, wherein said leg members have free ends which are spaced apart such that said leg members are easily clipped about said female member.

11. A quick connect assembly comprising:
a male member having an upset portion and a connector housing having a recess with a primary connector positioned therein, said primary connector defining a line of engagement, said connector housing receiving said male member and said upset and having a reduced diameter portion defined in an engaging ledge, and a generally L-shaped redundant clip member, said clip including a retaining head, a body portion and a base member, said retaining head having an insertion means for insertion into said connector housing to engage said upset portion, said insertion means being at least at said line of engagement, and said base member including spaced legs extending outwardly from said body portion and adapted to extend about said connector housing to interconnect said clip to said connector housing, said clip being slidable with respect to said connector housing between a locked position and an unlocked position with said spaced legs engaging said engaging ledge as said clip is moved between said locked and unlocked positions and with said legs each having a top edge defining a cam surface for engaging said engaging ledge to facilitate the insertion of said retaining head into said recess of said female member and said cam surface extending away from said retaining head distal to the body portion.

12. The quick connect assembly of claim 11, wherein said cam surface ends in a locking surface adjacent said body member which is adapted to engage said engaging surface when said clip is in said latched position.

13. The quick connect assembly of claim 11, wherein said leg members have opposed detents to receive said connector housing, said detents corresponding to the locked position of said clip.

14. The quick connect assembly of claim 11, wherein said connector housing has an exterior surface that is contoured to define at least a first section, and a reduced diameter second section, said legs of said clip being received between said first and second sections.

15. The quick connect assembly of claim 11, wherein said body portion includes a channel having a base and sidewalls, said sidewalls extending generally perpendicular to said base and ending in an edge that is contoured to generally mate with the exterior contour of said female member.

16. A quick connect assembly comprising:
a male member having an upset portion and a connector housing having a recess with a primary connector positioned therein, said primary connector defining a line of engagement, said connector housing receiving said male member and said upset, and a generally L-shaped redundant clip member, said clip including a retaining head, a body portion and a base member, said retaining head having an insertion means for insertion into said connector housing to engage said upset portion, said insertion means being at least at said line of engagement, and said base member including spaced legs extending outwardly from said body portion and adapted to extend about said connector housing to interconnect said clip to said connector housing, and said leg members having free ends spaced apart to be easily clipped about said female member, with said free ends being turned outwardly to facilitate clipping of said clip to said connector housing, said clip being slidable with respect to said connector housing between a locked and an unlocked position.

* * * * *

UNITED STATES PATENT AND TRADEMARK OFFICE
CERTIFICATE OF CORRECTION

PATENT NO. : 5,360,237
DATED : November 1, 1994
INVENTOR(S) : Carman, et al

It is certified that error appears in the above-indentified patent and that said Letters Patent is hereby corrected as shown below:

In claim 1, line 39 of column 6 of the patent, delete "ramming" and insert --ramping--.

Signed and Sealed this

Fourteenth Day of March, 1995

Attest:

BRUCE LEHMAN

Attesting Officer      Commissioner of Patents and Trademarks